US008223139B2

(12) United States Patent
Kurihara et al.

(10) Patent No.: US 8,223,139 B2
(45) Date of Patent: Jul. 17, 2012

(54) WRITING APPARATUS, ELECTRONIC PAPER SYSTEM, AND COMPUTER READABLE MEDIUM

(75) Inventors: Yoko Kurihara, Kanagawa (JP); Toshiroh Shimada, Kanagawa (JP); Tomoyuki Shoya, Kanagawa (JP); Naoki Hayashi, Kanagawa (JP); Minoru Koshimizu, Kanagawa (JP); Tsutomu Ishii, Kanagawa (JP); Yasunori Saito, Kanagawa (JP); Shigehiko Sasaki, Kanagawa (JP); Akira Ichiboshi, Kanagawa (JP); Hajime Ueno, Kanagawa (JP); Kyotaro Tomoda, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1064 days.

(21) Appl. No.: 12/141,454

(22) Filed: Jun. 18, 2008

(65) Prior Publication Data

US 2009/0153496 A1 Jun. 18, 2009

(30) Foreign Application Priority Data

Dec. 12, 2007 (JP) ................................ 2007-320356

(51) Int. Cl.
*G06F 3/038* (2006.01)

(52) U.S. Cl. ......................... 345/204; 345/156; 345/173

(58) Field of Classification Search .................. 345/107, 345/173

See application file for complete search history.

(56) References Cited

U.S. PATENT DOCUMENTS

| | | | | |
|---|---|---|---|---|
| 6,906,705 | B2 * | 6/2005 | Matsuo et al. | 345/206 |
| 7,154,452 | B2 * | 12/2006 | Nakamura et al. | 345/1.1 |
| 7,249,324 | B2 * | 7/2007 | Nakamura et al. | 715/776 |
| 7,298,365 | B2 * | 11/2007 | Moriyama | 345/173 |
| 2004/0196210 | A1 * | 10/2004 | Nagatsuka et al. | 345/1.1 |
| 2004/0207568 | A1 * | 10/2004 | Ooshima et al. | 345/1.1 |
| 2005/0104866 | A1 * | 5/2005 | Inui | 345/173 |
| 2005/0184956 | A1 * | 8/2005 | Wong et al. | 345/156 |
| 2007/0061337 | A1 * | 3/2007 | Saito et al. | 707/10 |
| 2007/0268271 | A1 * | 11/2007 | Kinjo | 345/173 |
| 2008/0303782 | A1 * | 12/2008 | Grant et al. | 345/156 |

FOREIGN PATENT DOCUMENTS

| | | |
|---|---|---|
| JP | A-2002-137499 | 5/2002 |
| JP | A-2003-067406 | 3/2003 |

* cited by examiner

*Primary Examiner* — Alexander Eisen
*Assistant Examiner* — Sanjiv D Patel
(74) *Attorney, Agent, or Firm* — Oliff & Berridge, PLC

(57) ABSTRACT

A writing apparatus includes: a detecting unit; a reading unit; a writing unit; a display; a first controlling unit; a second controlling unit; and a third controlling unit.

11 Claims, 8 Drawing Sheets

FIG. 2A

| ITEM | R/W | DATA |
|---|---|---|
| MEDIUM ID | RO | MEDIUM ID |
| PIXEL NUMBER | RO | 4,000 x 3,000 |
| CONTENT ID | RW | NULL |
| DISPLAY FORM | RW | NULL |

FIG. 2B

| ITEM | R/W | DATA |
|---|---|---|
| MEDIUM ID | RO | MEDIUM ID |
| PIXEL NUMBER | RO | 4,000 x 3,000 |
| CONTENT ID | RW | DOCUMENT-UUID |
| DISPLAY FORM | RW | INDEX |

FIG. 3A

| CONTENT ID | CONTENT DATA |
|---|---|
| ⋮ | ⋮ |

FIG. 3B

| PAGE NUMBER | PAGE DATA |
|---|---|
| ⋮ | ⋮ |

| INDEX ID | PAGE NUMBER LIST |
| --- | --- |
| ⋮ | ⋮ |

WRITING APPARATUS, ELECTRONIC PAPER SYSTEM, AND COMPUTER READABLE MEDIUM

CROSS-REFERENCE TO RELATED APPLICATIONS

This application is based on and claims priority under 35 U.S.C. 119 from Japanese Patent Application No. 2007-320356 filed Dec. 12, 2007.

BACKGROUND

1. Technical Field

The present invention relates to a writing apparatus, an electronic paper system, and a computer readable medium, which select a page included in content, and write and display the page on an electronic paper.

2. Related Art

An electronic paper in which a content image such as a document can be displayed and held in a no-power state, and the content image can be rewritten has been put into practical use. Such an electronic paper can be used as a content display medium as an alternative to paper. The application of an electronic paper is expected to expand.

Various types of electronic papers are employed depending on the system of writing a content image. In photo-addressable electronic paper, for example, a content image is projected by a writing apparatus, so that the content image is displayed and held on the electronic paper. In matrix-addressable electronic paper, a content image in the form of electronic data is written by a writing apparatus, so that the content image is displayed and held on the electronic paper.

In an electronic paper of any type, a displayed content image can be easily carried. Therefore, an electronic paper is useful as a medium for displaying contents in a mobile environment.

A usual content includes plural pages. It has been requested to develop a technique for, when a desired page is to be selectively displayed on an electronic paper, enabling the user to easily select the page of the writing object.

As a technique for selecting a page or the like, the following inventions are proposed.

SUMMARY

According to a first aspect of the present invention, a writing apparatus includes: a detecting unit that detects that an electronic paper in which an image is displayed and held in a no-power state, and which the image is rewritten is at a predetermined writing position; a reading unit that reads content identifying information from a storage disposed in the electronic paper at the writing position; a writing unit that writes and displays an image on the electronic paper at the writing position; a display that displays page numbers of a content including plural pages; a first controlling unit that controls the display to sequentially switchingly display page numbers of a content corresponding to the content identifying information that is read from the storage of the electronic paper by the reading unit; a second controlling unit that controls the page number switching of the first controlling unit in accordance with a change of an existing state of the electronic paper at the writing position; and a third controlling unit that controls the writing unit to write and display a page image of the page number that is displayed by the display, on the electronic paper at the writing position in response to a writing instruction.

BRIEF DESCRIPTION OF THE DRAWINGS

Exemplary embodiment of the present invention will be described in detail based on the following figures, wherein:

FIGS. 2A and 2B are views showing a data example of a storage portion of an electronic paper of the embodiment of the invention;

FIGS. 3A and 3B are views illustrating content data in the embodiment of the invention;

DETAILED DESCRIPTION

Figure 1:
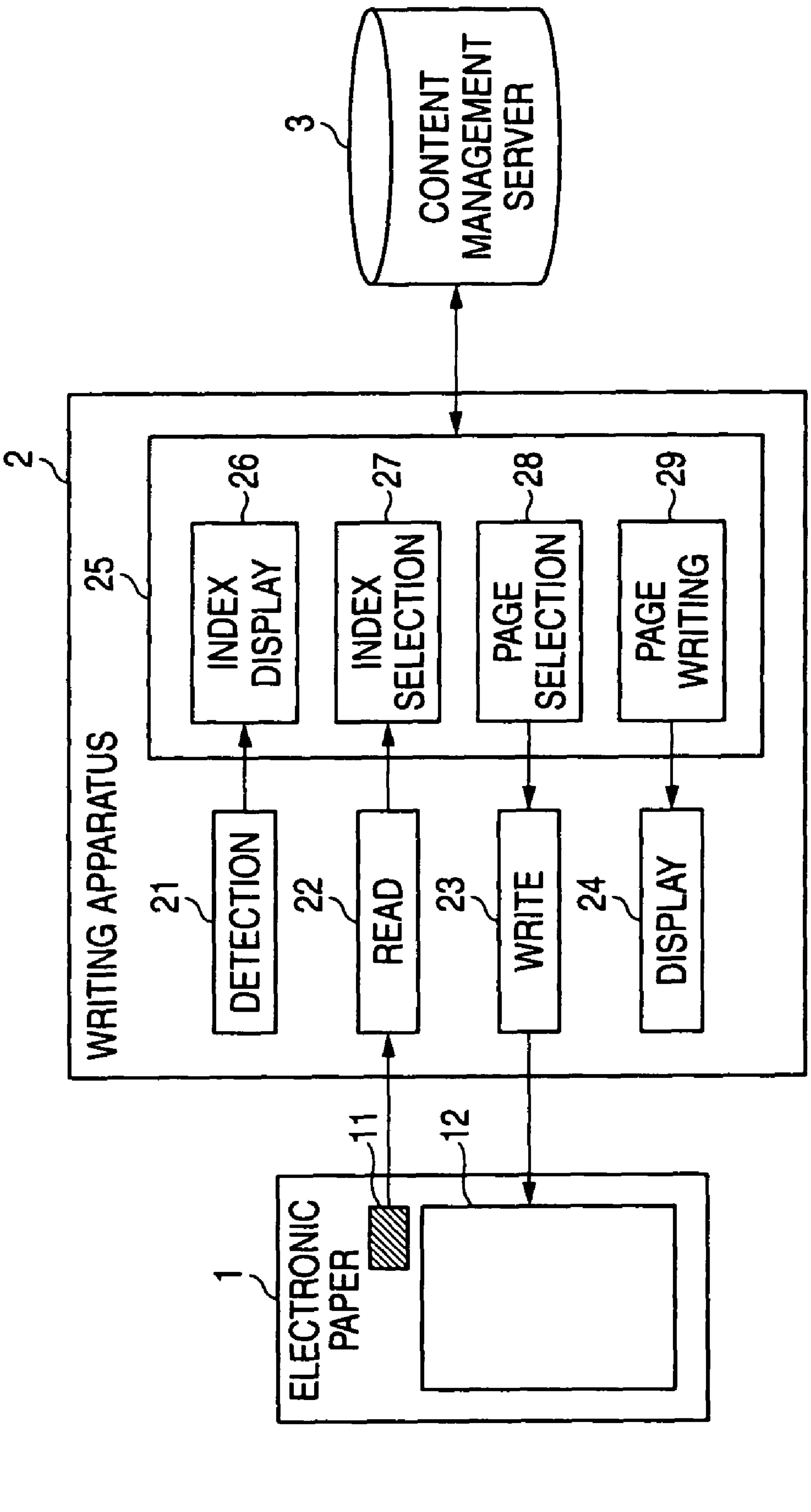
FIG. 1 is a configuration diagram of an electronic paper system of one embodiment of the invention.

An electronic paper system of an embodiment of the invention will be described.

First, an electronic paper which can be used in the electronic paper system of the embodiment will be described.

There are various types of electronic papers depending on the system of writing a content image. Hereinafter, the electronically writing type in which a content image in the form of electronic data is written by a writing apparatus, and the optically writing type in which a content image is projected by a writing apparatus to be written will be described.

Matrix-addressable electronic paper is a thin flexible medium having a size which is similar, for example, to that of an A4-size sheet, and has a structure in which fine colored particles (e.g., white particles and black particles) that are used as a toner in a copier are encapsulated between a pair of front and rear electrodes (at least the front electrode is transparent), and the electrodes are sandwiched between a pair of front and rear film substrates (at least the front substrate is transparent). The space between the electrode layers is configured as an air layer so that the colored particles can freely move. On the matrix-like electrode layers, an insulating layer which prevents the corresponding electrode layer from contacting with the colored particles is disposed. When a color filter is used, a color display can be realized by a simple structure.

In the electronic paper of the electronically writing type, in the state where a voltage is not applied to the electrodes, white particles which are negatively charged are collected in the rear face side, and by contrast black particles which are positively charged are collected in the surface side. When viewed from the surface side, the paper is in the black state. When a writing unit (driver) of a writing apparatus operates based on electronic data to invert the electrode polarities of required matrix portions corresponding to a content image to be displayed, the positional relationships of white particles and black particles are replaced with each other, and the content image is displayed by means of contrast between white particles and black particles. When the driver of the writing apparatus operates based on other electronic data, the content image which is displayed by means of contrast between white particles and black particles can be switched over. In this way, the electronic paper can be used many times.

Photo-addressable electronic paper is a thin flexible medium having a size which is similar, for example, to that of an A4-size sheet. For example, a content image is displayed on a writing unit (liquid crystal panel) of a writing apparatus, the electronic paper is overlaid on the liquid crystal panel, and the overlaid structure is irradiated with light while applying a voltage from an external power source to a writing electrode of the electronic paper, whereby the content image displayed on the liquid crystal panel is transferred, so that the image can be displayed and stored. Even after the voltage applied to the writing electrode is eliminated, the content image is kept held in the displayed state.

Photo-addressable electronic paper has a structure in which, for example, a layer of an organic photoconductive material (organic photoconductive layer) that is used in a copier, and that of a liquid crystal display material (a layer of microcapsulated cholesteric liquid crystal) are combined with each other, these layers are sandwiched by a pair of front and rear transparent electrodes, and the stacked structure is sandwiched by a pair of front and rear transparent base films. In this configuration, monochrome image display configured by white display in which light is reflected by the cholesteric liquid crystal layer, and black display in which light is absorbed by a black layer disposed between the cholesteric liquid crystal layer and the organic photoconductive material layer can be performed. The cholesteric liquid crystal has a characteristic that light of a color corresponding to the helical pitch is interference-reflected. When the cholesteric liquid crystal layer is configured by a stack of liquid crystals different helical pitches, therefore, a color display can be realized by a simple structure.

In the electronic paper of the optically writing type, when a content image to be transferred is displayed on the liquid crystal panel of the writing apparatus and displayed, and the voltage is applied to the writing electrode, for example, the light intensity is instantaneously converted to a reflection density, and the projected content image is held. When an erasure voltage is applied to the writing electrode, it is possible to erase the content image which is displayed and held.

A writing apparatus which writes a content image into such an electronic paper will be briefly described.

For example, a writing apparatus of the type which is applied to matrix-addressable electronic paper has a driver (writing unit) which is to be connected to the electronic paper, and, as described above, writes a content image based on electronic data (display image data which are adequate for the resolution and the like of the electronic paper), into the electronic paper.

For example, a writing apparatus of the type which is applied to photo-addressable electronic paper has: a display face (writing unit) such as a liquid crystal panel on which a content image is displayed, and which projects the image to the electronic paper; and a function of applying the voltage to the writing electrode disposed in the electronic paper, and, as described above, projects the content image to the electronic paper which is placed on the display face, thereby writing the content image.

An electronic paper system which will be described below uses photo-addressable electronic paper, and a writing apparatus of this type.

FIG. 1 shows the configuration of the electronic paper system of the embodiment.

The electronic paper system of the embodiment comprises: an electronic paper 1 which functions as a display medium of a content image; a writing apparatus 2 which writes and displays a content image on the electronic paper 1; and a content management server 3 which holds plural sets of contents.

In the electronic paper 1, a display portion 12 which can display and hold an image in a no-power state and rewrite the image is formed over a substantially whole of the medium surface, and a storage portion 11 which stores information relating to the electronic paper 1 is disposed in an end portion of the medium.

As shown in FIGS. 2A and 2B, the storage portion 11 has: a first region which stores information specific to the electronic paper 1, such as "Medium ID" for identifying the electronic paper 1, and "Pixel number" indicating the display ability of the electronic paper 1; and in addition a second region which stores information that can be changed in accordance with a content of a display object, such as "Content ID" of a content bound to the electronic paper 1, and "Display form" defining the manner of displaying the content. In FIG. 2A exemplifies a state where information is not stored in the second region, i.e., the electronic paper 1 to which a content is not bound, and (b) exemplifies a state where information is stored in the second region, i.e., the electronic paper 1 to which a content is bound.

The writing apparatus 2 has: a detecting unit 21 which detects that the electronic paper 1 is at a predetermined writing position; a reading unit 22 which reads information from the storage 11 of the electronic paper 1 at the writing position; a writing unit 23 which writes and displays a content image on the display portion 12 of the electronic paper 1 at the writing position; a display 24 which displays various kinds of information that is to be provided to the user; and a controlling section 25 which controls the operations of the function units 21 to 24.

The controlling section 25 comprises an index display controlling unit 26 (first controlling unit), a page selection controlling unit 28 (second controlling unit), a page writing controlling unit 29 (third controlling unit), and an index selection controlling unit 27 (fourth controlling unit).

In accordance with that the electronic paper 1 is detected to be at the writing position, the index display controlling unit 26 controls the writing unit 23 so as to write and display an index image indicating plural pages of a content corresponding to a content ID read from the electronic paper 1, on the electronic paper 1, and controls the display 24 so as to sequentially switchingly display the page numbers of the pages.

As shown in FIG. 3A, plural content data which are uniquely identified by respective content IDs are held in the content management server 3, and content data of the content of the writing object are specified on the basis of the content ID read from the electronic paper 1. As shown in FIG. 3B, content data include plural page data which are uniquely identified by respective page numbers. In the embodiment, the content management server 3 produces an index image indicating plural pages included in a content, based on content data, and provides the writing apparatus 2 with the index image and information of plural page numbers relating to the index image. For example, the writing apparatus 2 may produce an index image on the basis of content data, and an index image which is previously produced may be held in the content management server 3 while being included in content data.

The index image has a configuration which includes plural thumbnail images (images which are obtained by reducing page images to a predetermined size) of the pages. The page number (the number of the thumbnail images) included in the index image may be previously set in the content data held in the content management server 3, previously set in the storage portion 11 of the electronic paper 1, or set by the writing apparatus 2.

Figures 4, 5:
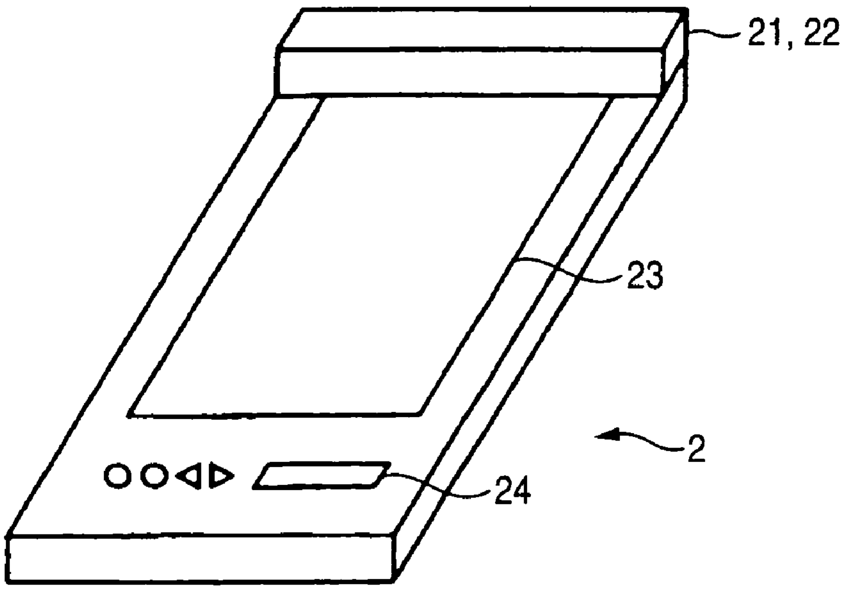
FIG. 4 is a view illustrating group management of pages in the embodiment of the invention.
FIG. 5 is a view showing the appearance of a writing apparatus in the embodiment of the invention.

In the case where the page number of a content is larger than that included in one index image, plural index images are formed. In this case, as shown in FIG. 4, group management is performed while correlating an index ID identifying an index image with a list of page numbers included in the index image, and the index display controlling unit 26 is controlled by the index selection controlling unit 27 which will be described later.

The index selection controlling unit 27 controls the display 24 so as to display that there is a group subsequent to a group in which the write displaying of the index image and the switching display of page numbers by the index display controlling unit 26 are performed. In accordance with that, in a state where the display is performed, it is redetected that the electronic paper 1 is at the writing position, the index display controlling unit 26 controls the writing unit 23 so as to write and display an index image of a subsequent group on the electronic paper 1, and controls the display 24 so as to switchingly display the page numbers of the pages of the subsequent group.

The display indicating that there is a subsequent group (index image) may be a display which simply shows the existence of the subsequent index image, that which shows the display order of the currently displayed index image in the total number of index images, or that which shows the number of remaining index images. The display may be a display of any kind as far as the user can know that there is a subsequent index image.

In the state where the electronic paper 1 is at the writing position, the page selection controlling unit 28 controls the index display controlling unit 26 so as to perform the page number switching, and, in response to detection of separation of the electronic paper 1 from the writing position, stops the page number switching (and the display relating to the subsequent group) of the index display controlling unit 26, and controls the display 24 so as to display the page number (or the display relating to the subsequent group) at this timing. The page selection controlling unit 28 in the embodiment has functions of receiving from the user, instructions for increasing or decreasing the page number in the step of one (or a predetermined number) by means of a page feed key disposed in the writing apparatus 2, and controlling the display 24 to display the page number which is changed in response to the instructions, so that, in the case where the page number is excessively changed, the page number can be manually adjusted.

In a state where the page selection controlling unit 28 controls the display 24 to display the page number (or the display relating to the subsequent group) in a stopping manner, the page writing controlling unit 29 controls the writing unit 23 so as to write and display a page image of the page number (or the index image of the subsequent group) on the electronic paper 1 with using the redetection that the electronic paper 1 is at the writing position, as writing instructions. In addition to the write displaying of a page image in response to writing instructions based on such redetection of the electronic paper 1, for example, a page image may be written and displayed in response to writing instructions which are received from the user through a button or the like disposed in the writing apparatus 2. The electronic paper 1 into which the page image is to be written may be an electronic paper 1 on which the index image is written and displayed, or another electronic paper 1.

In the writing apparatus 2 of the embodiment, the switching display is performed by repeating operations of counting up (incrementing by one page) the page number from the top page, returning to the top page when the count reaches the final page, and again counting up the page number (i.e., by circulation in ascending order). Alternatively, the switching display may be performed by repeating an operation of counting down (decrementing by one page) the page number from the final page (i.e., by circulation in descending order), or by repeating operations of counting up the page number from the top page, and counting down the page number from the final page. In place of such a continuous switching display, the switching display may be stopped when the count reaches the final page (or the top page) as a result of the counting up operation (or the counting down operation). In the embodiment, the switching of the page number is automatically performed at each elapse of a predetermined time period (for example, 1 second). Alternatively, as described later, the switching may be manually performed in response to an operation by the user using the electronic paper 1.

FIG. 5 shows the appearance of the writing apparatus 2 in the embodiment.

In the writing apparatus 2, in accordance with the arrangement of the storage portion 11 and the display portion 12 of the electronic paper 1, a communication section (the detecting unit 21 and the reading unit 22) which accesses the storage portion 11 by wireless or wired communication, and a first liquid crystal panel (the writing unit 23) which displays a content image to be projected onto the display portion 12 are disposed. Furthermore, also a small second liquid crystal panel (the display 24) which is used for performing the switching display of the page number and the like is disposed.

In the embodiment, namely, the face of the first liquid crystal panel functions as the writing positions. In response to that the storage portion 11 of the electronic paper 1 is placed with being directed to the communication section while the display portion 12 of the electronic paper 1 is overlaid on the first liquid crystal panel, it is detected that the electronic paper 1 is at the writing position, and information is read from the storage portion 11 of the electronic paper 1.

Figure 6:
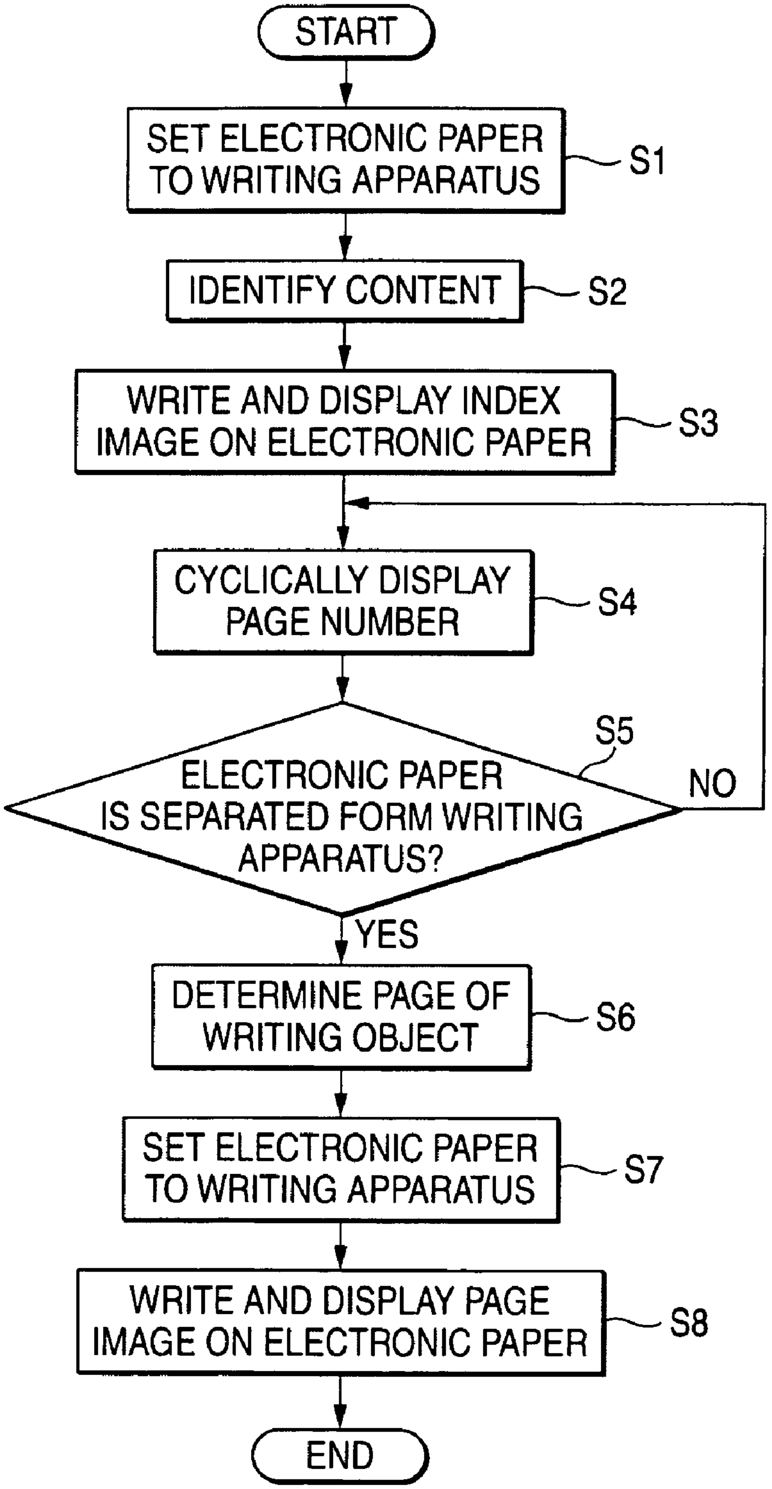
FIG. 6 is a view showing a process flow of a writing control in the embodiment of the invention.

FIG. 6 shows a process flow of the writing control in the electronic paper system of the embodiment.

When the user sets the electronic paper 1 to the writing position defined in the writing apparatus 2, the detecting unit 21 detects that the electronic paper 1 is at the writing position (step S1). Then, the reading unit 22 reads a content ID from the storage portion 11 of the electronic paper 1, and the content management server 3 specifies the content on the basis of the content ID, and provides the writing apparatus 2 with the index image and information of page numbers included in the image (step S2).

The writing apparatus 2 controls the writing unit 23 so as to write and display the index image provided from the content management server 3, on the electronic paper 1 (step S3), and the display 24 so as to sequentially switchingly display the page numbers of the pages at each elapse of the predetermined time period (step S4).

The detecting unit 21 monitors whether the electronic paper 1 is at the writing position or not (step S5). When the user separates the electronic paper 1 from the writing apparatus 2 (writing position), the separation of the electronic paper 1 is detected by the detecting unit 21 to stop the switching of the page numbers, and the page number at this timing is set to the display state by the display 24, thereby determining the page of the writing object (step S6).

When, in this state, the user again sets the electronic paper 1 (or another electronic paper 1) to the writing apparatus 2 (writing position), the detecting unit 21 detects that the electronic paper 1 is at the writing position (step S7), and the page image of the determined page number is written and displayed on the set electronic paper 1 by the writing unit 23 (step S8).

In the above description, the corresponding content is identified by the content ID which is read from the storage portion 11 of the electronic paper 1. Alternatively, a medium management server or the like holding a correspondence table showing correspondence relationships between the medium ID of the electronic paper 1 and the content ID may be disposed in the electronic paper system, the medium ID may be read from the storage portion 11 of the electronic paper 1, and the content may be identified on the basis of the correspondence table (namely, the medium ID is used as the content identifying information).

In the above description, the switching of page numbers is automatically performed at each elapse of a predetermined time period. Alternatively, in response to a user operation using the electronic paper 1, the page number switching may be manually performed by a process in which the page selection controlling unit 28 controls the index display controlling unit 26 so as to perform the page number switching each time when, after the electronic paper 1 is once separated from the writing position, it is redetected that the electronic paper is at the writing position.

In this case, for example, the process of switching page numbers is performed in the following manner.

When the user sets the electronic paper 1 to the writing apparatus 2 (writing position), the writing apparatus 2 reads the content ID from the electronic paper 1, and displays the page number (page 1) on the basis of information of the page number of the content which is provided from the content management server 3 in accordance with the content ID.

When thereafter the user once separates the electronic paper 1 from the writing apparatus 2 (writing position) and then again sets thereto, the writing apparatus 2 compares the content ID which is previously read, with that which is newly read from the electronic paper 1, and, if the content IDs coincide with each other, the page number (page 1) which is previously displayed is incremented, and the next page number (page 2) is displayed.

Thereafter, in a similar manner, each time when the operation of moving the electronic paper 1 storing the common content ID close to the writing apparatus 2 and then separating therefrom is repeated (for example, the electronic paper 1 is tapped on the writing apparatus 2), the page number is incremented and displayed, and, in response to the reception of the writing instructions from the user through the button or the like disposed in the writing apparatus 2, the page image of the page number which is currently displayed is written and displayed on the electronic paper 1. When an electronic paper 1 storing a different content ID is set, the switching display of page numbers is started with respect to the content of the content ID which is newly read.

Next, the display contents of an electronic paper, and the switching display of page numbers in the electronic paper system of the embodiment will be described with reference to FIGS. 7A to 9B. In these figures, FIGS. 7A, 8A and 9A exemplify the display contents of the electronic paper, and FIGS. 7B, 8B and 9B exemplifies the switching display of page numbers.

Figure 7A:
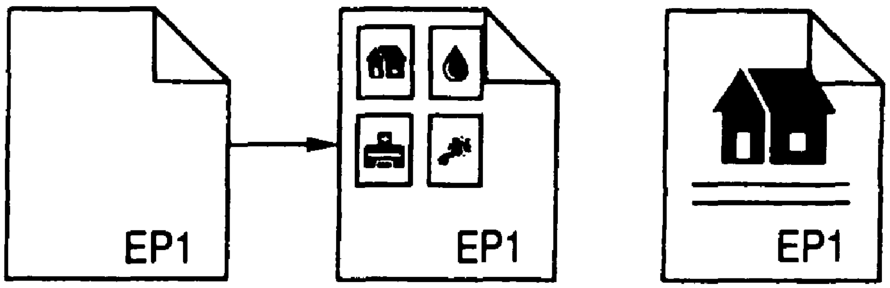
FIGS. 7A and 7B are views illustrating display contents of an electronic paper, and a switching display of page numbers in the embodiment of the invention.
Figure 7B:
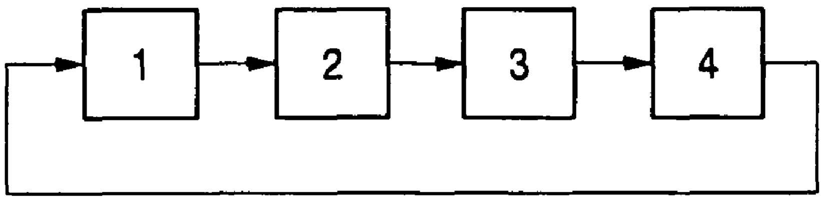

FIGS. 7A and 7B show a case where an electronic paper EP1 bound to the content of the page number (in the figure, 4 pages) which can be included in one index image is prepared.

Initially, the display of the electronic paper EP1 is in a blank state. When the user sets the electronic paper EP1 to the writing apparatus 2, the index image relating to the corresponding content is written and displayed on the electronic paper EP1, and the page numbers (pages 1 to 4) relating to the index image are sequentially switchingly displayed on the display 24.

When the user then separates the electronic paper EP1 from the writing apparatus 2 in a state where a desired page number is displayed on the display 24, the switching display of page numbers is stopped, and the writing object (in the figure, page 1) is determined. When the user thereafter again sets the electronic paper EP1 to the writing apparatus 2, the page image of the determined first page is written and displayed on the electronic paper EP1.

Figure 8A:
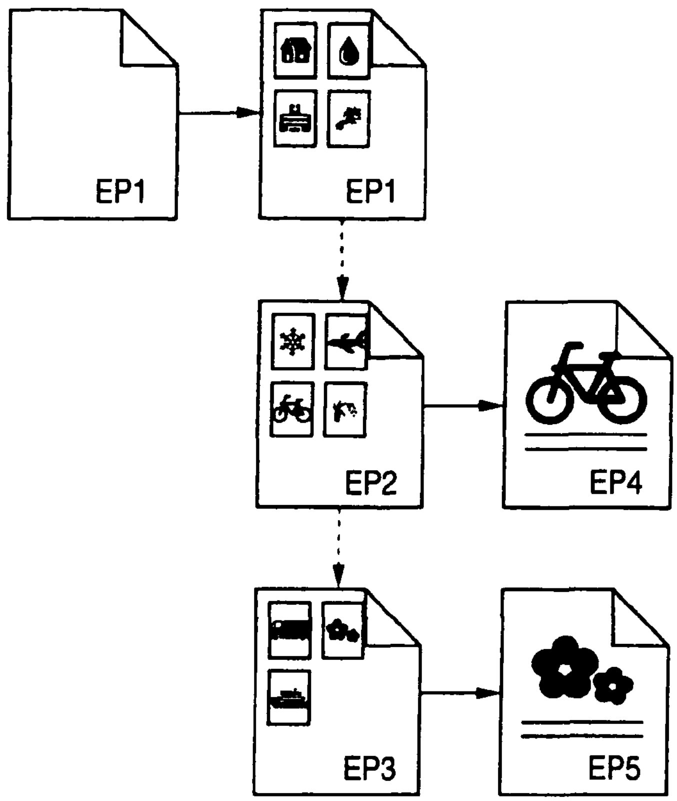
FIGS. 8A and 8B are views illustrating display contents of an electronic paper, and a switching display of page numbers in the embodiment of the invention.
Figure 8B:
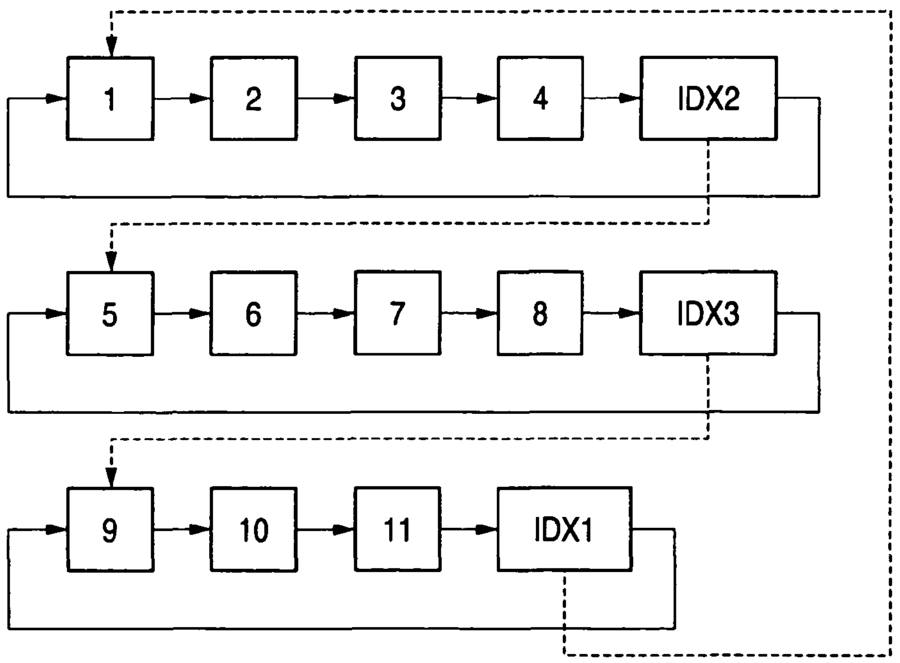

FIGS. 8A and 8B show a case where an electronic paper EP1 bound to the content of the page number (in the figure, 11 pages) which extends over three index images, and plural electronic papers EP2 to EP5 which are not bound to a content are prepared.

Initially, the display of the electronic paper EP1 is in a blank state. When the user sets the electronic paper EP1 to the writing apparatus 2, the first index image relating to the corresponding content is written and displayed on the electronic paper EP1, and the page numbers (pages 1 to 4) relating to the first index image are sequentially switchingly displayed on the display 24.

On the display 24, also a display showing the subsequent index image (second index image) is performed while being included in the switching display. When the user separates the electronic paper EP1 from the writing apparatus 2 in a state where this display is performed, the switching display of page numbers is stopped, and the writing object (second index image) is determined. When the user thereafter sets the electronic paper EP2 to the writing apparatus 2, the second index image is written and displayed on the electronic paper EP2, and the page numbers (pages 5 to 8) relating to the second index image are sequentially switchingly displayed on the display 24.

When the user then separates the electronic paper EP2 from the writing apparatus 2 in a state where a desired page number is displayed on the display 24, the switching display of page numbers is stopped, and the writing object (in the figure, page 7) is determined. When the user thereafter again sets the electronic paper EP4 to the writing apparatus 2, the page image of the determined seventh page is written and displayed on the electronic paper EP4.

On the display 24, also a display showing the subsequent index image (third index image) is performed while being included in the switching display. When the user separates the electronic paper EP2 from the writing apparatus 2 in this display state and sets the electronic paper EP3 to the writing apparatus 2, the third index image is written and displayed on the electronic paper EP3, and the page numbers (pages 9 to 11) relating to the third index image are sequentially switchingly displayed on the display 24. In the switching display of page numbers relating to the final index image, also a display showing the first index image is performed while being included in the switching display, so that it is possible to again return to the index of the first index image.

Figure 9A:
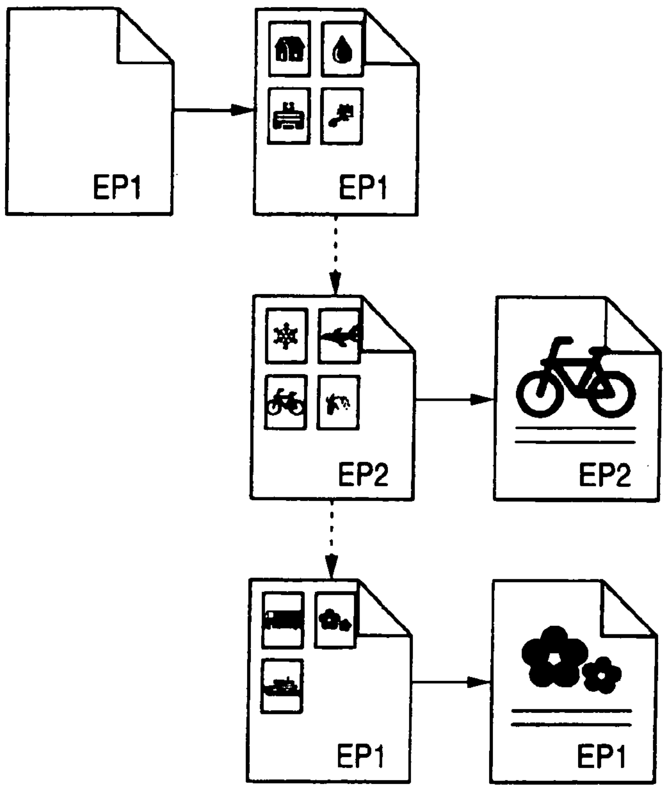
FIGS. 9A and 9B are views illustrating display contents of an electronic paper, and a switching display of page numbers in the embodiment of the invention.
Figure 9B:
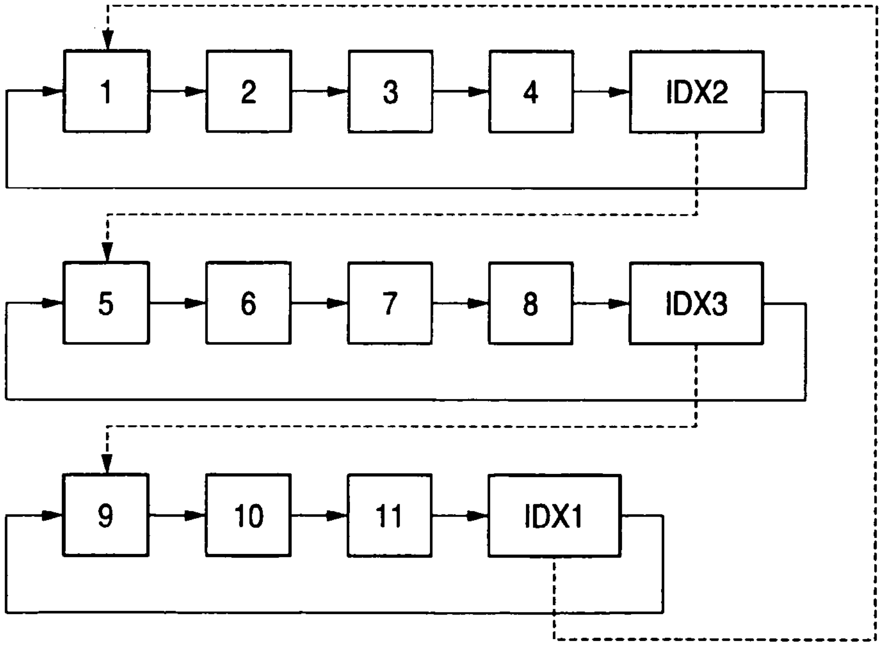

FIGS. 9A and 9B show a case where the electronic paper EP1 bound to the content of the page number (in the figure, 11 pages) which extends over three index images, and in addition only the electronic paper EP2 which is not bound to a content are prepared.

Also in this case, when an electronic paper 1 bound to another content is not used, the user can cause a desired image to be written and displayed on the electronic paper 1 (EP1 or EP2) in the same manner as described with reference to FIGS. 8A and 8B.

Even in the case where the object to be written to the next set electronic paper 1 is determined as a result of the separation of the electronic paper 1 from the writing apparatus 2 in a state where the switching display of page numbers is performed, when an electronic paper 1 bound to another content is set, the writing is canceled, and the write displaying of the index image relating to the other content, and the switching display of page numbers are performed.

Next, a work of binding the electronic paper 1 to a content which is performed as a preliminary step to the writing control in the invention will be described.

Figure 10:
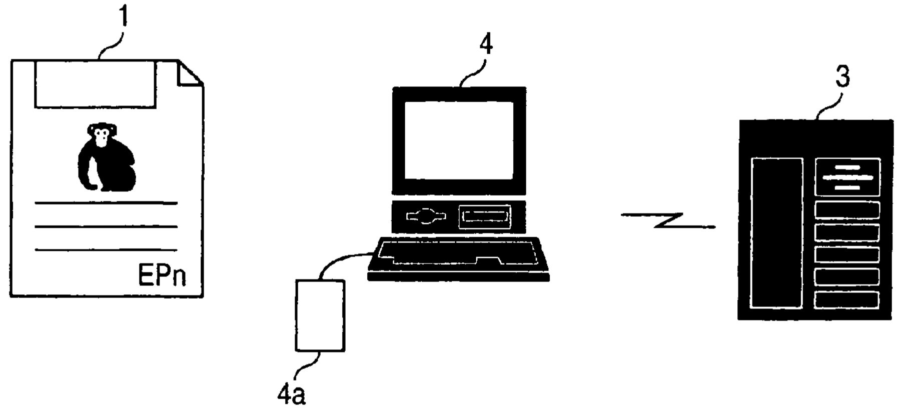
FIG. 10 is a view illustrating a work of binding an electronic paper in the embodiment of the invention to content.

As shown in FIG. 10, for example, an accessing apparatus 4*a* which accesses the storage portion 11 of the electronic paper 1 is disposed in a user terminal 4. When the user operates the user terminal 4 to designate a content, the corresponding content ID is written into the storage portion 11 of the electronic paper 1 which is set to the accessing apparatus 4*a*, and the electronic paper 1 is bound to the content. In the case where the electronic paper 1 is already bound to the content (the content ID is already stored in the storage portion 11), it is preferable to display a dialog screen which is used for checking a change of binding.

Figure 11:
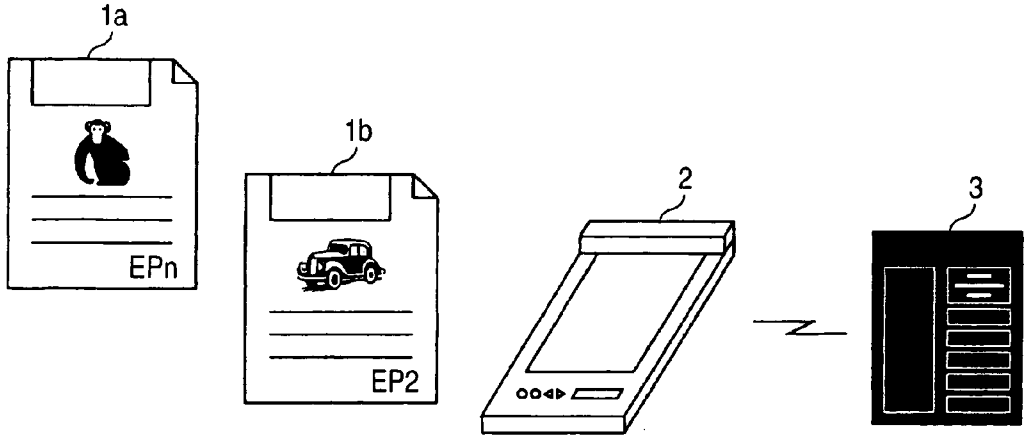
FIG. 11 is a view illustrating a work of binding an electronic paper in the embodiment of the invention to content.

As shown in FIG. 11, for example, the binding of the electronic paper 1 to a content may be performed by the writing apparatus 2. Namely, when an electronic paper 1*a* which is bound to a content (the content ID is stored in the storage portion 11), and an electronic paper 1*b* which is not bound to a content (the content ID is not stored in the storage portion 11) are set to the writing apparatus 2 with being overlaid with each other, the content ID stored in the storage portion 11 of the electronic paper 1*a* is copied to the storage portion 11 of the electronic paper 1*b*. When, together with the copying operation, an index image relating to the content is written and displayed on the electronic paper 1*b*, it is possible to easily check that the copying operation is correctly performed.

Figure 12:
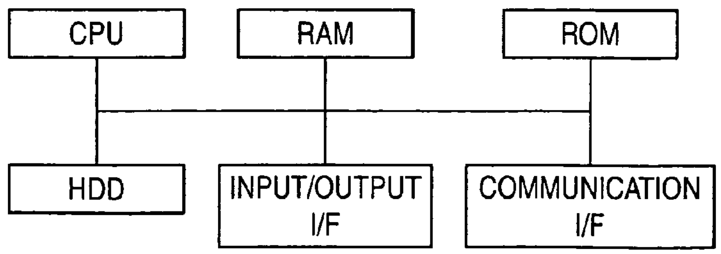
FIG. 12 is a configuration diagram of hardware of a writing apparatus of one embodiment of the invention.

FIG. 12 shows a main hardware configuration of the writing apparatus 2 of the embodiment.

The writing apparatus 2 of the embodiment is configured by a computer having hardware resources such as: a CPU which performs various calculating processes; a RAM which functions as a working area for the CPU; a ROM which stores basic control programs; an HDD which stores programs and the like for realizing functions relating to the invention; an input/output I/F which is configured by a liquid crystal panel for providing the user with various information, and an interface with devices for receiving various operation inputs from the user, such as buttons; and a communication I/F which is an interface for communicating with another apparatus.

The programs relating to the invention are read from the HDD to be expanded in the RAM, and executed by the CPU, whereby the function units relating to the invention are realized in the computer of the writing apparatus 2.

The programs relating to the invention are provided to the person implementing the invention in a form in which an external storage medium storing the programs such as a CD-ROM is distributed, or in a form in which the programs are distributed via the Internet.

The function units of the writing apparatus 2 in the invention are not restricted to the manner in which they are realized by a software configuration as in the embodiment, and may be configured by respective dedicate hardware modules.

The function units of the writing apparatus 2 in the invention are not restricted to the manner in which they are disposed in one computer as in the embodiment, and may be distributedly disposed in plural computers.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. A writing apparatus comprising:

a detecting unit that detects that an electronic paper, in which an image is displayed and held in a no-power state and which the image is rewritten, is at a predetermined writing position;

a reading unit that reads content identifying information from a storage disposed in the electronic paper at the writing position;

a writing unit that writes and displays an image on the electronic paper at the writing position;

a display that displays page numbers of a content including a plurality of pages;

a first controlling unit that controls the display to sequentially switchingly display page numbers of a content corresponding to the content identifying information that is read from the storage of the electronic paper by the reading unit;

a second controlling unit that controls the page number switching of the first controlling unit in accordance with a change of an existing state of the electronic paper at the writing position; and a third controlling unit that controls the writing unit to write and display a page image associated with the page number that is displayed by the display, on the electronic paper at the writing position in response to a writing instruction.

2. The writing apparatus as claimed in claim 1, wherein the second controlling unit controls the first controlling unit to perform the page number switching in a state where the electronic paper is at the writing position, and, in response to detection of separation of the electronic paper from the writing position, stops the page number switching of the first controlling unit, and controls the display to display a page number at this timing, and, while redetection that, in a state where the second controlling unit controls the display to display the page number in a stopping manner, the electronic paper is at the writing position is used as the writing instruction, the third controlling unit controls the writing unit to write and display a page image of the page number on the electronic paper.

3. The writing apparatus as claimed in claim 1, wherein, each time when, after the electronic paper is once separated from the writing position, it is redetected that the electronic paper is at the writing position, the second controlling unit controls the first controlling unit to perform the page number switching.

4. The writing apparatus as claimed in claim 1, wherein, in response to detection that the electronic paper is at the writing position, the first controlling unit controls the writing unit to write and display an index image on the electronic paper, the index image indicating a plurality of pages of content corresponding to the content identifying information read from the electronic paper, and controls the display to sequentially switchingly display page numbers of the pages.

5. The writing apparatus as claimed in claim 4, wherein each content has a configuration in which a plurality of pages are partitioned into a plurality of groups according to indexes, and the apparatus further comprises:

a fourth controlling unit that controls the display to display that there is a group subsequent to a group in which the write displaying of the index image and the switching display of page numbers by the first controlling unit are performed, controls, in response to the writing instruction in a state where the display is performed, the writing unit to write and display an index image of the subsequent group on the electronic paper, and controls the display to sequentially switchingly display page numbers of pages of the subsequent group.

6. The writing apparatus as claimed in claim 1, wherein the first controlling unit controls the display to cyclically display page numbers of the content.

7. The writing apparatus as claimed in claim 1, wherein the content previously includes an index image indicating a plurality of pages.

8. The writing apparatus as claimed in claim 1, further comprising:

a producing unit that produces thumbnail images of pages of the content to produce an index image.

9. An electronic paper system comprising:

a writing apparatus according to claim 1; and a content storage that stores content to be provided to the writing apparatus.

10. An electronic paper system comprising:

a writing apparatus according to claim 1; and an electronic paper in which an image written by the writing apparatus is displayed and held in a no-power state, and the image is rewritten by the writing apparatus.

11. A non-transitory computer readable medium storing a program causing a computer to execute a process for selecting a page included in content, and for writing and displaying the page on an electronic paper, the process comprising:

detecting that the electronic paper, in which an image is displayed and held in a no-power state and the image is rewritten, is at a predetermined writing position;

reading content identifying information from a storage disposed in the electronic paper at the writing position;

writing and displaying an image on the electronic paper at the writing position;

displaying page numbers of content including a plurality of pages;

controlling the display to sequentially switchingly display page numbers of content corresponding to the content identifying information that is read from the storage of the electronic paper by the reading unit;

controlling the page number switching of the first controlling unit in accordance with a change of an existing state of the electronic paper at the writing position; and controlling the writing unit to write and display a page image associated with the page number that is displayed by the display, on the electronic paper at the writing position in response to a writing instruction.

* * * * *